United States Patent
He et al.

(10) Patent No.: US 12,302,309 B2
(45) Date of Patent: May 13, 2025

(54) ADAPTIVE MONITORING FOR CONTROL MESSAGES

(71) Applicant: QUALCOMM Incorporated, San Diego, CA (US)

(72) Inventors: Linhai He, San Diego, CA (US); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/305,775

(22) Filed: Jul. 14, 2021

(65) Prior Publication Data
US 2022/0053516 A1    Feb. 17, 2022

Related U.S. Application Data

(60) Provisional application No. 62/706,392, filed on Aug. 13, 2020.

(51) Int. Cl.
*H04W 72/1263* (2023.01)
*H04W 24/08* (2009.01)
*H04W 72/20* (2023.01)

(52) U.S. Cl.
CPC ....... *H04W 72/1263* (2013.01); *H04W 24/08* (2013.01); *H04W 72/20* (2023.01)

(58) Field of Classification Search
CPC ............. H04W 72/1263; H04W 24/08; H04W 72/20; H04W 72/23; H04W 52/0216; H04W 76/28

(Continued)

(56) References Cited

U.S. PATENT DOCUMENTS

| 11,882,547 B2 * | 1/2024 | Kim | H04W 56/001 |
| 2014/0105154 A1 * | 4/2014 | Yang | H04L 5/0053 370/329 |

(Continued)

FOREIGN PATENT DOCUMENTS

| CA | 2859961 A1 * | 6/2013 | ........... H04L 5/0053 |
| CA | 3113973 A1 * | 4/2020 | ........... H04L 5/0053 |

(Continued)

*Primary Examiner* — Hashim S Bhatti
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a user equipment (UE) may monitor, within an activation period for a control channel associated with the UE, for messages from a base station within first monitoring occasions defined by a first monitoring pattern. The UE may further monitor, after expiry of a timer associated with the first monitoring pattern, for messages from the base station within second monitoring occasions defined by a second monitoring pattern. In some aspects, the UE may receive, while monitoring within the first monitoring occasions, control information from the base station, and reset the timer associated with the first monitoring pattern. Additionally, or alternatively, the UE may monitor, after expiry of a timer associated with the second monitoring pattern, for messages from the base station within third monitoring occasions defined by a third monitoring pattern. Numerous other aspects are provided.

30 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0185541 A1* | 7/2014 | Gaal | H04L 1/0072 |
| | | | 370/329 |
| 2019/0149380 A1* | 5/2019 | Babaei | H04W 72/0446 |
| | | | 370/330 |
| 2019/0254110 A1* | 8/2019 | He | H04L 5/0048 |
| 2020/0154295 A1* | 5/2020 | Lin | H04W 52/0216 |

FOREIGN PATENT DOCUMENTS

| | | | | |
|---|---|---|---|---|
| EP | 3148270 A1 * | 3/2017 | | |
| WO | WO-2020032868 A1 * | 2/2020 | ........... | H04L 5/0053 |
| WO | WO-2020033647 A1 * | 2/2020 | ........... | H04L 1/0038 |

* cited by examiner

ADAPTIVE MONITORING FOR CONTROL MESSAGES

CROSS-REFERENCE TO RELATED APPLICATION

This patent application claims priority to U.S. Provisional Patent Application No. 62/706,392, filed on Aug. 13, 2020, entitled "ADAPTIVE MONITORING FOR CONTROL MESSAGES," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for adaptive monitoring for control messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to monitor, within an activation period for a control channel associated with the UE, for messages from a base station within one or more first monitoring occasions defined by a first monitoring pattern. The one or more processors may be further configured to monitor, after expiry of a timer associated with the first monitoring pattern, for messages from the base station within one or more second monitoring occasions defined by a second monitoring pattern.

Some aspects described herein relate to an apparatus for wireless communication at a base station. The apparatus may include a memory and one or more processors coupled to the memory. The one or more processors may be configured to determine whether a timer associated with a first monitoring pattern has expired. The one or more processors may be further configured to transmit, to a UE and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired.

Some aspects described herein relate to a method of wireless communication performed by a UE. The method may include monitoring, within an activation period for a control channel associated with the UE, for messages from a base station within one or more first monitoring occasions defined by a first monitoring pattern. The method may further include monitoring, after expiry of a timer associated with the first monitoring pattern, one or more second monitoring occasions defined by a second monitoring pattern.

Some aspects described herein relate to a method of wireless communication performed by a base station. The method may include determining whether a timer associated with a first monitoring pattern has expired. The method may further include transmitting, to a UE and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired.

Some aspects described herein relate to a non-transitory computer-readable medium that stores a set of instructions for wireless communication by a UE. The set of instructions, when executed by one or more processors of the UE, may cause the UE to monitor, within an activation period for a control channel associated with the UE, for messages from a base station within one or more first monitoring occasions defined by a first monitoring pattern. The set of instructions, when executed by one or more processors of the UE, may further cause the UE to monitor, after expiry of a timer associated with the first monitoring pattern, one or more second monitoring occasions defined by a second monitoring pattern.

Some aspects described herein relate to a non-transitory computer-readable medium that stores a set of instructions for wireless communication by a base station. The set of instructions, when executed by one or more processors of the base station, may cause the base station to determine whether a timer associated with a first monitoring pattern has expired. The set of instructions, when executed by one or more processors of the base station, may further cause the base station to transmit, to a UE and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired.

Some aspects described herein relate to an apparatus for wireless communication. The apparatus may include means for monitoring, within an activation period for a control channel associated with the apparatus, for messages from a base station within one or more first monitoring occasions defined by a first monitoring pattern. The apparatus may further include means for monitoring, after expiry of a timer associated with the first monitoring pattern, one or more second monitoring occasions defined by a second monitoring pattern.

Some aspects described herein relate to an apparatus for wireless communication. The apparatus may include means for determining whether a timer associated with a first monitoring pattern has expired. The apparatus may further include means for transmitting, to a UE and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
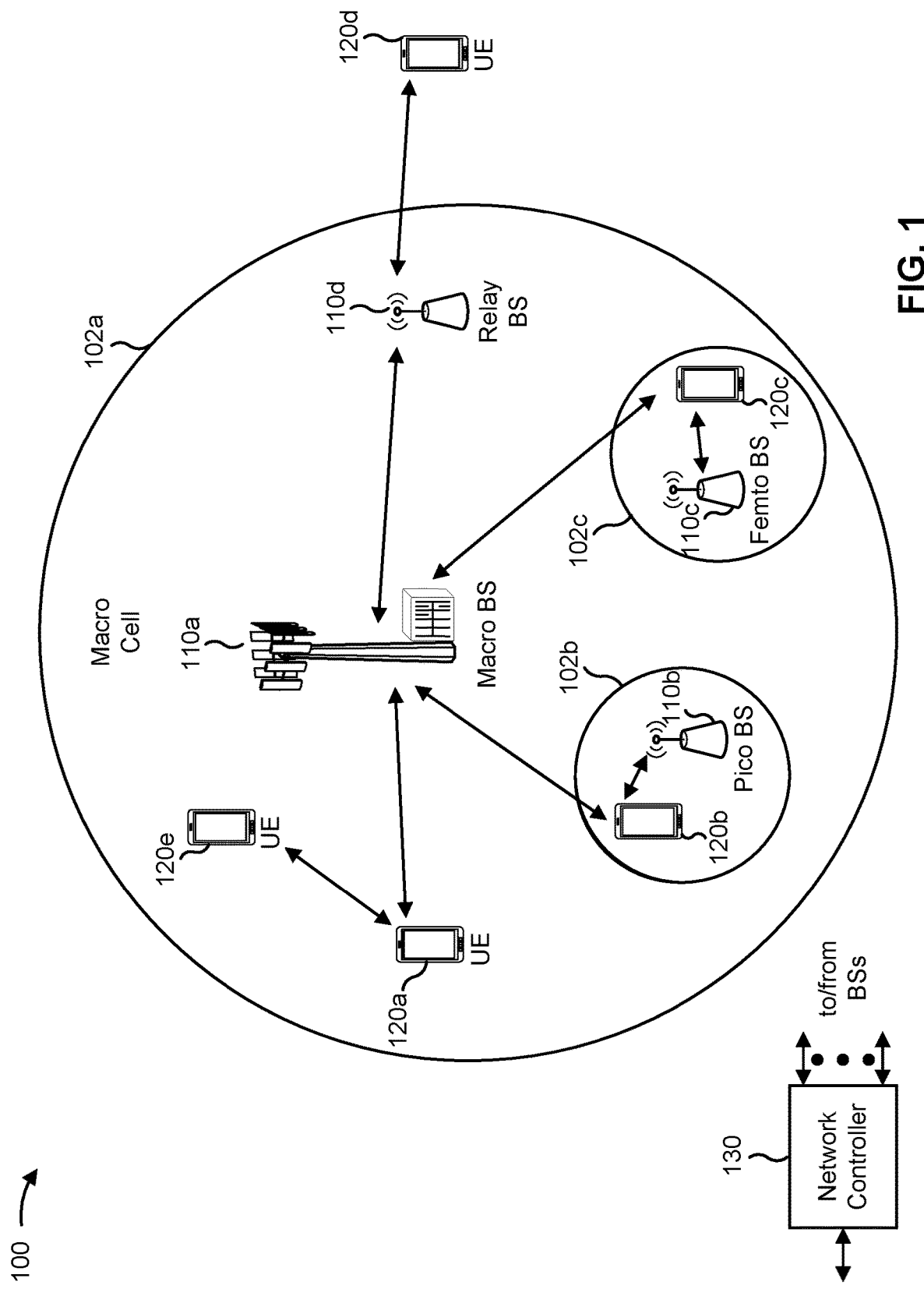
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
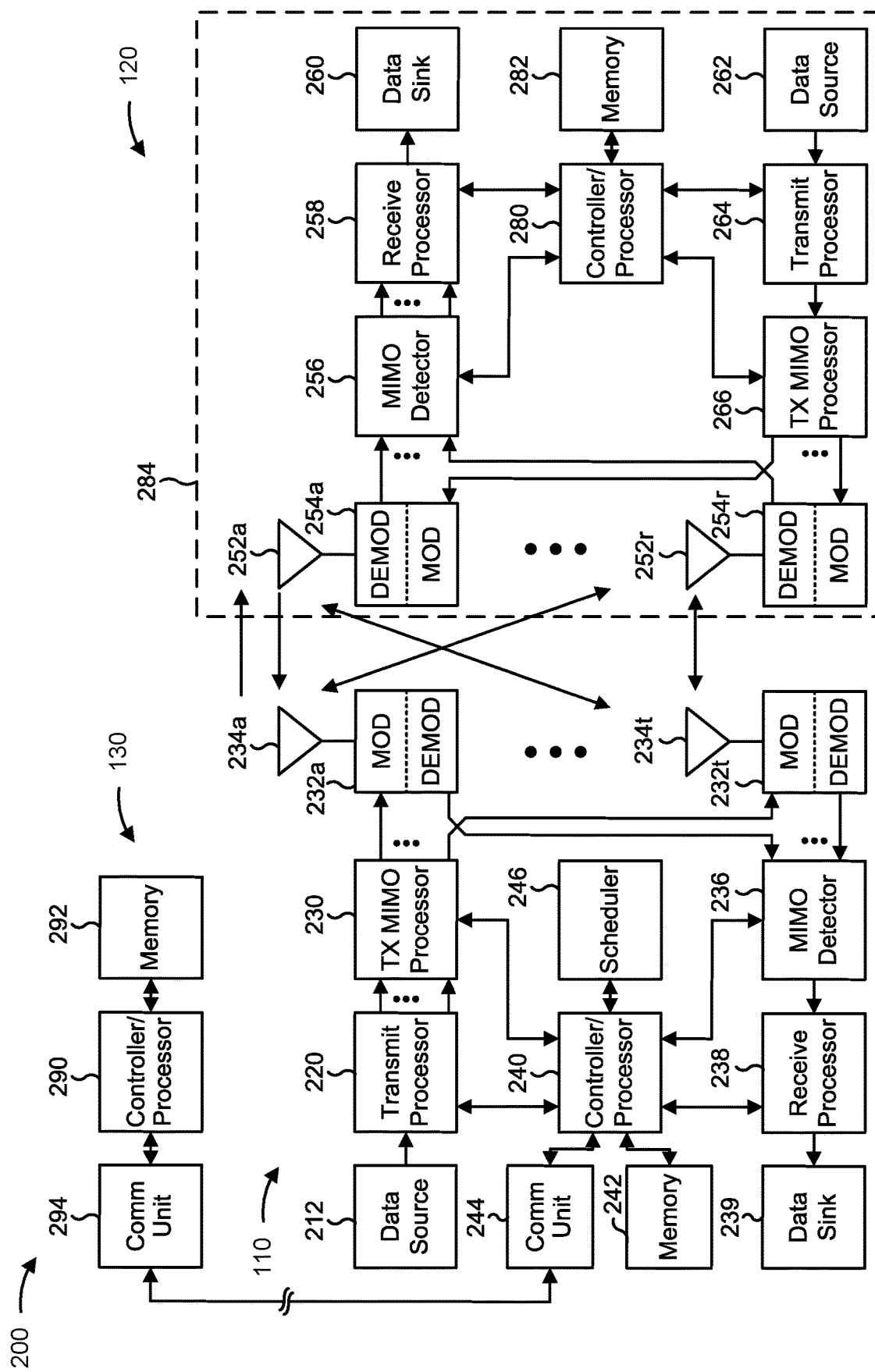
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with adaptive monitoring for control messages, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for monitoring, within an activation period for a control channel associated with the UE, for messages from a base station (e.g., the base station 110 and/or apparatus 1100 of FIG. 11) within one or more first monitoring occasions defined by a first monitoring pattern; and/or means for monitoring, after expiry of a timer associated with the first monitoring pattern, one or more second monitoring occasions defined by a second monitoring pattern. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 1100 of FIG. 11) may include means for determining whether a timer associated with a first monitoring pattern has expired; and/or means for transmitting, to a UE (e.g., the UE 120 and/or apparatus 1000 of FIG. 10) and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
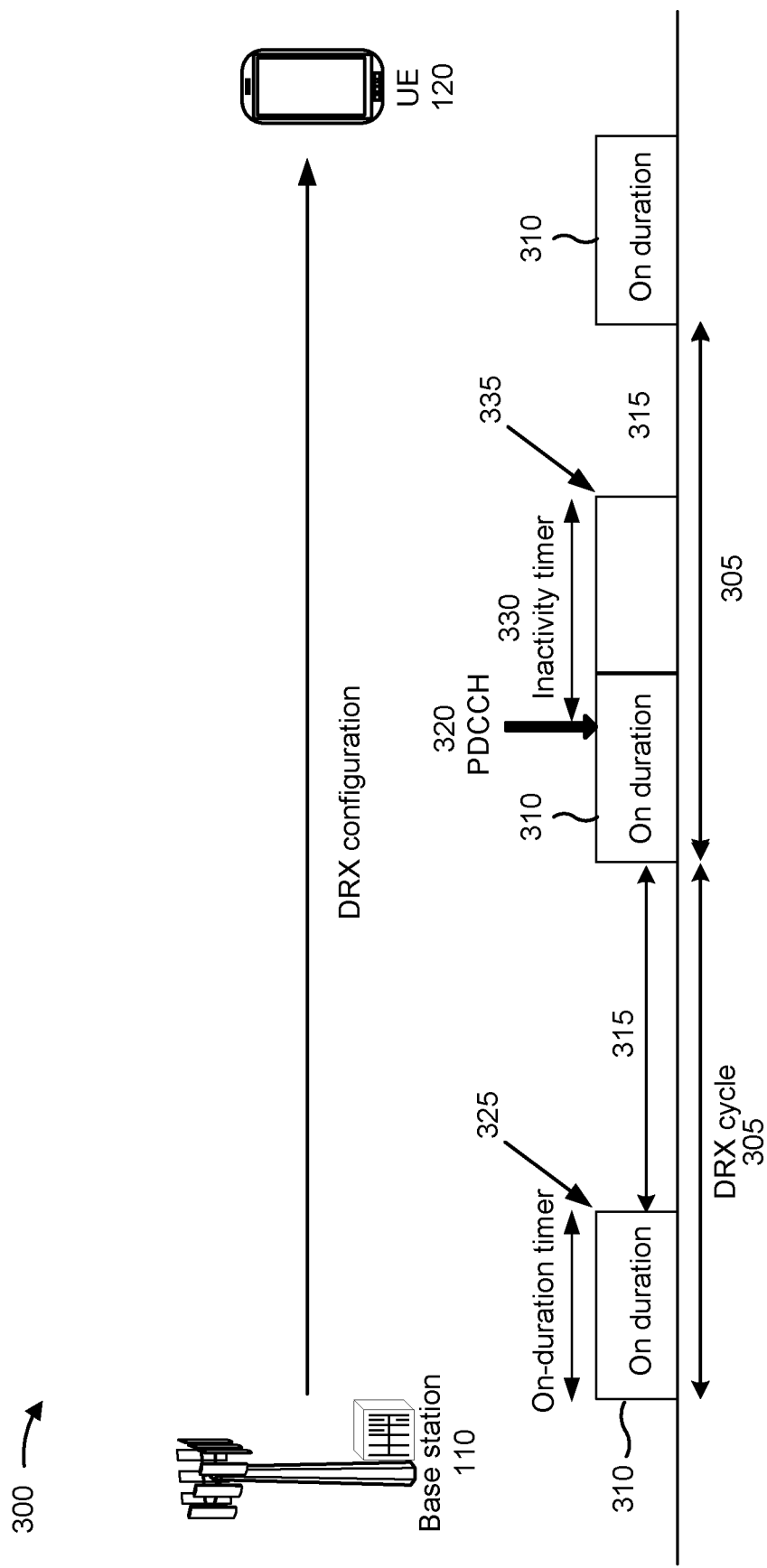
FIG. 3 is a diagram illustrating an example of a discontinuous reception (DRX) configuration, in accordance with the present disclosure.

FIG. 3 is a diagram illustrating an example 300 of a discontinuous reception (DRX) configuration, in accordance with the present disclosure. As shown in FIG. 3, a base station 110 may transmit a DRX configuration to a UE 120 to configure a DRX cycle 305 for the UE 120. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described below, the UE 120 may monitor a physical downlink control channel (PDCCH) during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot, a subframe, and/or the like). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

As indicated above, FIG. 3 is provided as an example. Other examples may differ from what is described with respect to FIG. 3.

Figure 4:
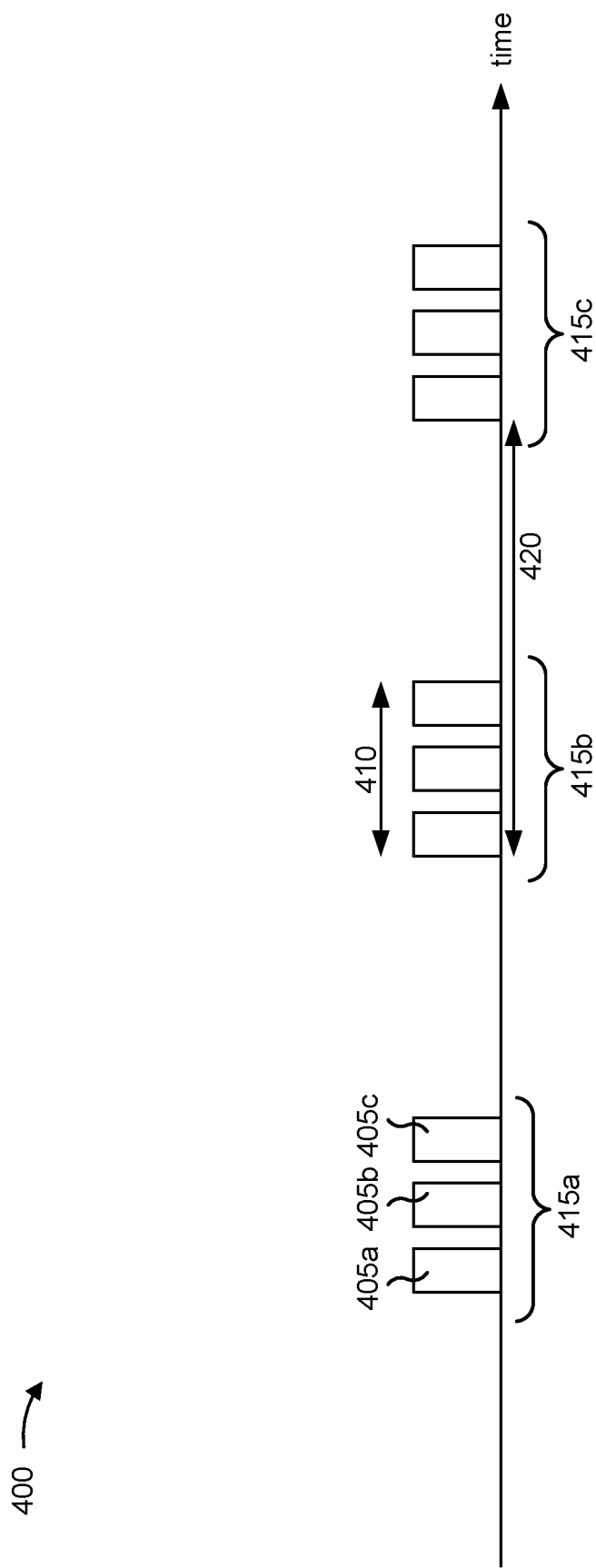
FIG. 4 is a diagram illustrating an example of monitoring for control messages, in accordance with the present disclosure.

FIG. 4 is a diagram illustrating an example 400 of monitoring for control messages, in accordance with the present disclosure. Example 400 may be used by a UE to monitor for control messages (e.g., PDCCH communications) from a base station. Accordingly, in some aspects, example 400 may be used during a DRX active state (e.g., a DRX on duration 310, as described in connection with FIG. 3) for the UE.

As shown in FIG. 4, the UE may monitor one or more occasions (e.g., occasion 405a, occasion 405b, and occasion 405c) during a duration 410. The one or more occasions within the duration 410 may be referred to as a "burst." Accordingly, as shown in FIG. 4, occasions 405a, 405b, and 405c may form burst 415a. In some aspects (e.g., as defined in 3GPP specifications), the one or more occasions may be consecutive occasions. As used herein, "consecutive occasions" may refer to two or more occasions that occupy slots that are consecutive in time. Each occasion may occupy some or all of a corresponding slot. As used herein, a "slot" may refer a portion of a radio frame within an LTE, 5G, or other wireless communication structure. In some aspects, a slot may include one or more symbols. Moreover, a "symbol" may refer to an OFDM symbol or other similar symbol within a slot.

As further shown in FIG. 4, the bursts may repeat with a periodicity 420. Accordingly, as shown in FIG. 4, the UE may monitor occasions within bursts 415a, 415b, 415c, and so on, according to periodicity 420. For example, the UE may monitor the first burst 415a of occasions for the duration 410, and then after a timer associated with the periodicity 420 has expired, monitor a second burst 415b of occasions for the duration 410. The UE may repeat this cycle until exiting the DRX active state.

In some situations, using a fixed monitoring pattern, as described in connection with FIG. 4, increases latency. For example, as defined in existing 3GPP specifications, the UE may monitor occasions according to a fixed periodicity 420 even when a base station is actively transmitting downlink data to the UE. Accordingly, the UE and the base station experience latency on the downlink because the UE may stop monitoring after the duration 410, delaying transmission of further downlink data until after the timer associated with the periodicity 420 has expired. In other situations, the fixed monitoring pattern wastes battery power and processing resources of the UE. For example, the UE may monitor occasions for the duration 410, according to the fixed periodicity 420, even when the base station is not actively transmitting downlink data and even when the base station has not actively transmitted downlink data within one or more occasions.

Techniques and apparatuses described herein allow a UE (e.g., UE 120) to adaptively monitor for control messages (e.g., PDCCH communications) from a base station (e.g., base station 110). Accordingly, the UE 120 may monitor with increased frequency when the base station 110 is transmitting downlink data, in order to reduce latency. Moreover, the UE 120 may monitor with decreased frequency when the base station 110 is not and has not been, within one or more occasions, transmitting downlink data, in order to conserve processing resources and extend battery life. In some aspects, the base station 110 may use control information (e.g., DCI) to switch the UE 120 between more frequent monitoring and less frequent monitoring. Accordingly, the base station 110 may use control information as described herein to reduce latency and/or reduce power and processing resource consumption of the UE 120.

As indicated above, FIG. 4 is provided as an example. Other examples may differ from what is described with respect to FIG. 4.

Figure 5:
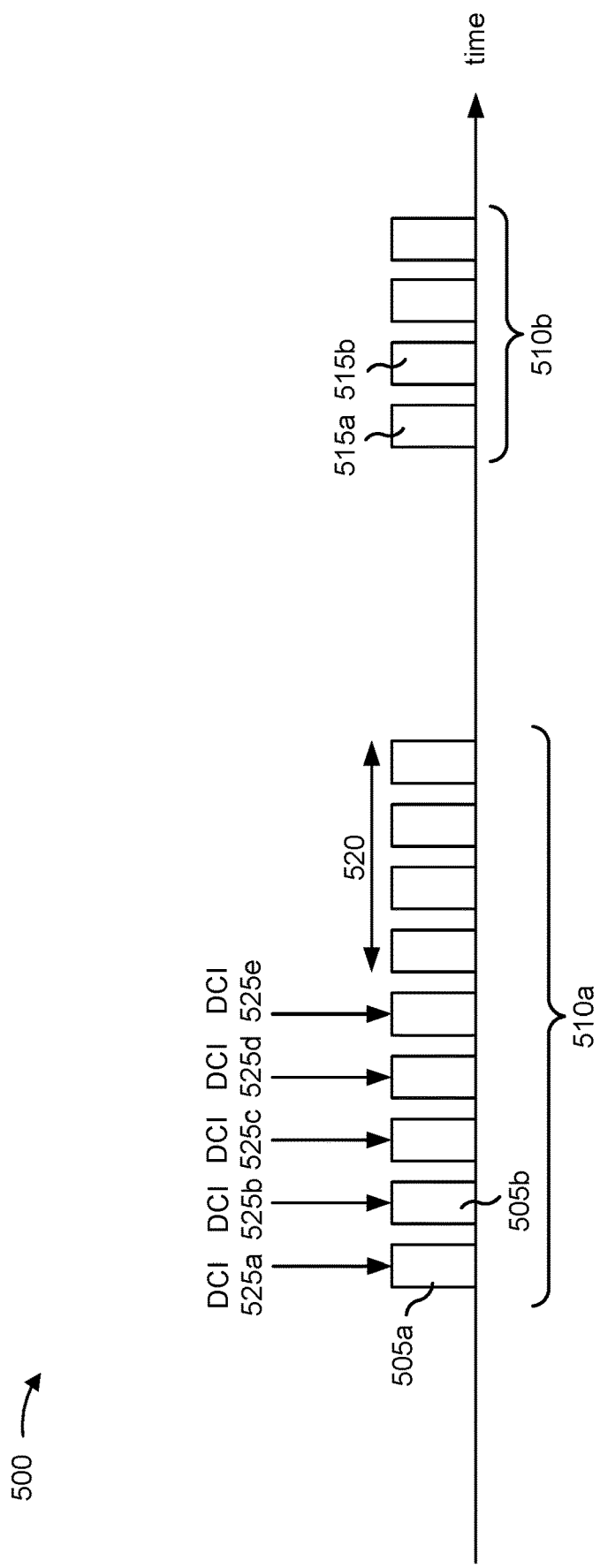
FIGS. 5, 6, and 7 are diagrams illustrating examples associated with adaptive monitoring for control messages, in accordance with the present disclosure.

FIG. 5 is a diagram illustrating an example 500 associated with adaptive monitoring for control messages, in accordance with the present disclosure. Example 500 may be used by a UE (e.g., UE 120) to monitor for control messages (e.g., PDCCH communications) from a base station (e.g., base station 110). Accordingly, in some aspects, example 500 may be used during a DRX active state (e.g., DRX on duration 310, as described in connection with FIG. 3) for the UE 120.

As shown in FIG. 5, the UE 120 may monitor, within an activation period for a control channel associated with the UE 120, for messages from the base station 110 within one or more first monitoring occasions (e.g., occasions 505a, 505b, and so on) defined by a first monitoring pattern 510a. As described herein, the activation period for the control channel may be a DRX active time for the UE 120.

In some aspects, as shown in FIG. 5, the first monitoring pattern 510a may include consecutive slots. As used herein, "consecutive slots" may refer to two or more slots that are consecutive in time. The one or more first monitoring occasions (e.g., occasions 505a and 505b) may occupy some or all of each slot. Additionally, or alternatively, the first monitoring pattern 510a may include periodic slots. For example, as used herein, "periodic slots" may refer to two or more slots that are periodic in time. Accordingly, in some aspects, the UE 120 may monitor every other slot (e.g., periodicity of two), every third slot (e.g., periodicity of three), and so on (e.g., higher periodicities) in addition to, or in lieu of, monitoring consecutive slots.

As further shown in FIG. 5, the UE 120 may monitor, after expiry of a timer 520 associated with the first monitoring pattern 510a, for messages from the base station 110 within one or more second monitoring occasions (e.g., occasions 515a, 515b, and so on) defined by a second monitoring pattern 510b. Similar to the one or more first monitoring occasions, the UE 120 may monitor for messages from the base station 110 within the one or more second monitoring occasions within the activation period for the control channel (e.g., within the DRX active time for the UE 120).

Moreover, in some aspects, the second monitoring pattern 510b may include consecutive slots and/or periodic slots, as described herein. In some aspects, the first monitoring pattern 510a and the second monitoring pattern 510b may both include consecutive slots or may include periodic slots that are associated with a same periodicity. As an alternative, one of the first monitoring pattern 510a and the second monitoring pattern 510b may include consecutive slots, and the other of the first monitoring pattern 510a and the second monitoring pattern 510b may include periodic slots. As another alternative, one of the first monitoring pattern 510a and the second monitoring pattern 510b may include periodic slots associated with a shorter periodicity, and the other of the first monitoring pattern 510a and the second monitoring pattern 510b may include periodic slots associated with a longer periodicity.

As further shown in FIG. 5, the one or more first monitoring occasions (e.g., occasions 505a and 505b) may be associated with a first periodicity, the one or more second monitoring occasions (e.g., occasions 515a and 515b) may be associated with a second periodicity, and the second periodicity may be longer than the first periodicity. In example 500, the one or more first monitoring occasions are continuous or periodic slots that repeat until expiry of the timer 520. Accordingly, the first periodicity is zero. As an alternative, the one or more first monitoring occasions may be associated with a non-zero periodicity (e.g., as described below in connection with FIG. 6).

As further shown in FIG. 5, the UE 120 may receive, while monitoring within the one or more first monitoring occasions, control information (e.g., DCI 525) from the base station 110. In some aspects, the control information may schedule a control message (e.g., a PDCCH communication) such that the base station 110 can transmit downlink data to the UE 120 (e.g., on a PDSCH). When the UE 120 receives the control information, the UE 120 may reset the timer 520 associated with the first monitoring pattern 510a based at least in part on the control information. Accordingly, as long as the UE 120 continues receiving control information from the base station 110, the UE 120 will continue monitoring according to the first monitoring pattern 510a rather than the second monitoring pattern 510b. Accordingly, in example 500, the UE resets the timer 520 after receiving DCI 525a, after receiving DCI 525b, after receiving DCI 525c, after receiving DCI 525d, and after receiving DCI 525e.

In some aspects, the UE 120 may reset the timer 520 when the control information is associated with new data from the base station 110 and/or resources for the UE 120 to transmit new data (e.g., on an uplink with the base station 110). Accordingly, in some aspects, the UE 120 may refrain from resetting the timer 520 when the control information is associated with existing downlink data from the base station 110. For example, when the base station 110 transmits DCI to schedule a PDCCH communication for additional downlink data on the same PDSCH, the UE 120 may not reset the timer 520.

In some aspects, the base station 110 may trigger the UE 120 to change from the first monitoring pattern 510a to the second monitoring pattern 510b regardless of the timer 520. For example, the UE 120 may receive, from the base station 110, control information (e.g., DCI) that indicates a change from the first monitoring pattern 510a to the second monitoring pattern 510b. In some aspects, the control information may include a field (e.g., a bit, an integer, or any other data structure) that indicates the change. The field may be defined by 3GPP specifications and/or another standard. Based at least in part on the control information, the UE 120 may monitor for messages from the base station 110 within the one or more second monitoring occasions (e.g., occasions 515a and 515b) defined by the second monitoring pattern 510b.

In some aspects, the one or more first monitoring occasions and the one or more second monitoring occasions are both associated with a first UE-specific search space (USS). The UE 120 may be further configured for one or more additional USSs, such as one or more monitoring occasions associated with a second USS. The second USS may be associated with a periodicity that is an integer multiple of a periodicity of the first monitoring pattern 510a and a periodicity of the second monitoring pattern 510b. Accordingly, the UE 120 may exit the activation period for the control channel associated with the UE 120 (e.g., enter a DRX sleep state 315, as described in connection with FIG. 3) without disrupting the periodicities of the USSs. Additionally, the second USS and the first USS may be associated with a same start offset. Accordingly, the UE 120 may begin monitoring both USSs when re-entering the activation period for the control channel associated with the UE 120.

By using adaptive monitoring as described in connection with FIG. 5, the UE 120 may adaptively monitor for control messages (e.g., PDCCH communications) from the base station 110. Accordingly, the UE 120 may monitor with increased frequency when the base station 110 is transmitting downlink data, in order to reduce latency. Moreover, the UE 120 may monitor with decreased frequency when the base station 110 is not and has not been, for one or more occasions, transmitting downlink data, in order to conserve processing resources and extend battery life. In some aspects, the base station 110 may use control information (e.g., DCI) to switch the UE 120 between more frequent monitoring and less frequent monitoring. Accordingly, the base station 110 may use control information to reduce latency and/or reduce power and processing resource consumption of the UE 120.

As indicated above, FIG. 5 is provided as an example. Other examples may differ from what is described with respect to FIG. 5.

Figure 6:
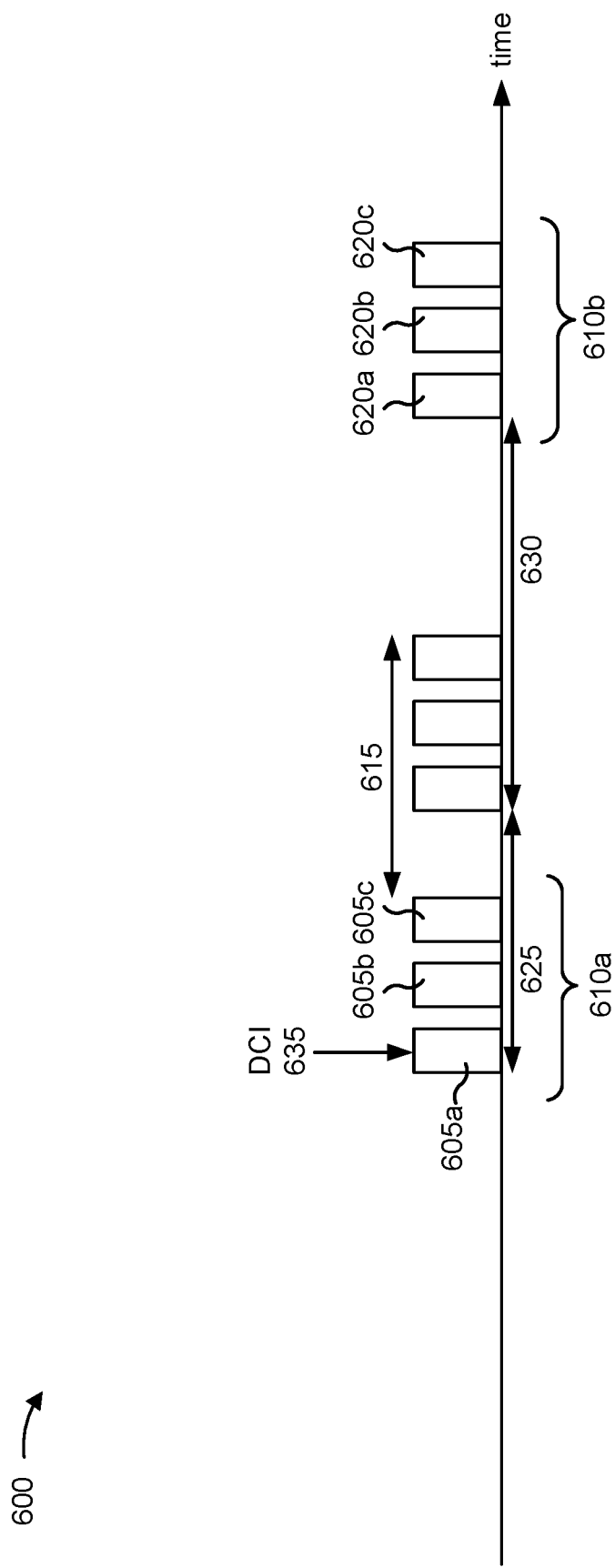

FIG. 6 is a diagram illustrating an example 600 associated with adaptive monitoring for control messages, in accordance with the present disclosure. Example 600 may be used by a UE (e.g., UE 120) to monitor for control messages (e.g., PDCCH communications) from a base station (e.g., base station 110). Accordingly, in some aspects, example 600 may be used during a DRX active state (e.g., DRX on duration 310, as described in connection with FIG. 3) for the UE 120.

As shown in FIG. 6, the UE 120 may monitor, within an activation period for a control channel associated with the UE 120, for messages from the base station 110 within one or more first monitoring occasions (e.g., occasions 605a, 605b, and 605c) defined by a first monitoring pattern 610a. As described above, the activation period for the control channel may be a DRX active time for the UE 120.

In some aspects, as shown in FIG. 6, the first monitoring pattern 610a may include consecutive slots. The one or more first monitoring occasions may occupy some or all of each slot. Additionally, or alternatively, the first monitoring pattern 610a may include periodic slots. Accordingly, in some aspects, the UE 120 may monitor every other slot (e.g., periodicity of two), every third slot (e.g., periodicity of three), and so on (e.g., higher periodicities) in addition to, or in lieu of, monitoring consecutive slots.

As further shown in FIG. 6, the UE 120 may monitor, after expiry of a timer 615 associated with the first monitoring pattern 610a, for messages from the base station 110 within one or more second monitoring occasions (e.g., occasions 620a, 620b, and 620c) defined by a second monitoring pattern 610b. Similar to the one or more first monitoring occasions, the UE 120 may monitor for messages from the base station 110 within the one or more second monitoring occasions within the activation period for the control channel (e.g., within the DRX active time for the UE 120).

Moreover, in some aspects, the second monitoring pattern 610b may include consecutive slots and/or periodic slots, as described above. In some aspects, the first monitoring pattern 610a and the second monitoring pattern 610b may both include consecutive slots or may include periodic slots associated with a same periodicity. As an alternative, one of the first monitoring pattern 610a and the second monitoring pattern 610b may include consecutive slots, and the other of the first monitoring pattern 610a and the second monitoring pattern 610b may include periodic slots. As another alternative, one of the first monitoring pattern 610a and the second monitoring pattern 610b may include periodic slots associated with a shorter periodicity, and the other of the first monitoring pattern 610a and the second monitoring pattern 610b may include periodic slots associated with a longer periodicity.

As further shown in FIG. 6, the one or more first monitoring occasions (e.g., occasions 605a, 605b, and 605c) may include a first burst associated with a first periodicity 625, the one or more second monitoring occasions (e.g., occasions 620a, 620b, and 620c) may include a second burst associated with a second periodicity 630, and the second periodicity 630 may be longer than the first periodicity 625. In example 600, the one or more first monitoring occasions are included in a first burst associated with a short cycle periodicity 625 that repeats until expiry of the timer 615. Accordingly, the first periodicity is non-zero. As an alternative, the one or more first monitoring occasions may be associated with a zero periodicity (e.g., as described in connection with FIG. 5).

As further shown in FIG. 6, the first burst may include a same number of occasions as the second burst. As an alternative, the first burst may include fewer occasions or more occasions than the second burst. Additionally, or alternatively, and as further shown in FIG. 6, the timer 615 associated with the first monitoring pattern 610a may be an integer multiple of the first periodicity 625. For example, the timer 615 may be one, two, three, or more times the first periodicity 625.

As further shown in FIG. 6, the UE 120 may receive, while monitoring the first burst, control information (e.g., DCI 635) from the base station 110. In some aspects, the control information may schedule a control message (e.g., a PDCCH communication) such that the base station 110 can transmit downlink data to the UE 120 (e.g., on a PDSCH). When the UE 120 receives the control information, the UE 120 may reset the timer 615 associated with the first monitoring pattern based at least in part on the control information. Accordingly, as long as the UE 120 continues receiving control information from the base station 110, the UE 120 will continue monitoring according to the first monitoring pattern 610a rather than the second monitoring pattern 610b. Accordingly, in example 600, the UE resets the timer 615 after receiving DCI 635.

In some aspects, the UE 120 may reset the timer 615 when the control information is associated with new data from the base station 110 and/or resources for the UE 120 to transmit new data (e.g., on an uplink with the base station 110). Accordingly, in some aspects, the UE 120 may refrain from resetting the timer 615 when the control information is associated with existing downlink data from the base station 110. For example, when the base station 110 transmits DCI to schedule a PDCCH communication for additional downlink data on the same PDSCH, the UE 120 may not reset the timer 615.

In some aspects, the base station 110 may trigger the UE 120 to change from the first monitoring pattern 610a to the second monitoring pattern 610b regardless of the timer 615. For example, the UE 120 may receive, from the base station 110, control information (e.g., DCI) that indicates a change from the first monitoring pattern 610a to the second monitoring pattern 610b. In some aspects, the control information may include a field (e.g., a bit, an integer, or any other data structure) that indicates the change. The field may be defined by 3GPP specifications and/or another standard. Based at least in part on the control information, the UE 120 may monitor for messages from the base station 110 within the one or more second monitoring occasions (e.g., occasions 620a, 620b, and 620c) defined by the second monitoring pattern 610b.

In some aspects, the one or more first monitoring occasions and the one or more second monitoring occasions are both associated with a first USS. The UE 120 may be further configured for one or more additional USSs, such as one or more monitoring occasions associated with a second USS. The second USS may be associated with a periodicity that is an integer multiple of a periodicity of the first monitoring pattern 510a and a periodicity of the second monitoring pattern 510b. Accordingly, the UE 120 may exit the activation period for the control channel associated with the UE 120 (e.g., enter a DRX sleep state 315, as described in connection with FIG. 3) without disrupting the periodicities of the USSs. Additionally, the second USS and the first USS may be associated with a same start offset. Accordingly, the UE 120 may begin monitoring both USSs when re-entering the activation period for the control channel associated with the UE 120.

By using adaptive monitoring as described in connection with FIG. 6, the UE 120 may adaptively monitor for control messages (e.g., PDCCH communications) from the base station 110. Accordingly, the UE 120 may monitor with increased frequency when the base station 110 is transmitting downlink data, in order to reduce latency. Moreover, the UE 120 may monitor with decreased frequency when the base station 110 is not and has not been, for one or more occasions, transmitting downlink data, in order to conserve processing resources and extend battery life. In some aspects, the base station 110 may use control information (e.g., DCI) to switch the UE 120 between more frequent monitoring and less frequent monitoring. Accordingly, the base station 110 may use control information as described herein to reduce latency and/or reduce power and processing resource consumption of the UE 120.

As indicated above, FIG. 6 is provided as an example. Other examples may differ from what is described with respect to FIG. 6.

Figure 7:
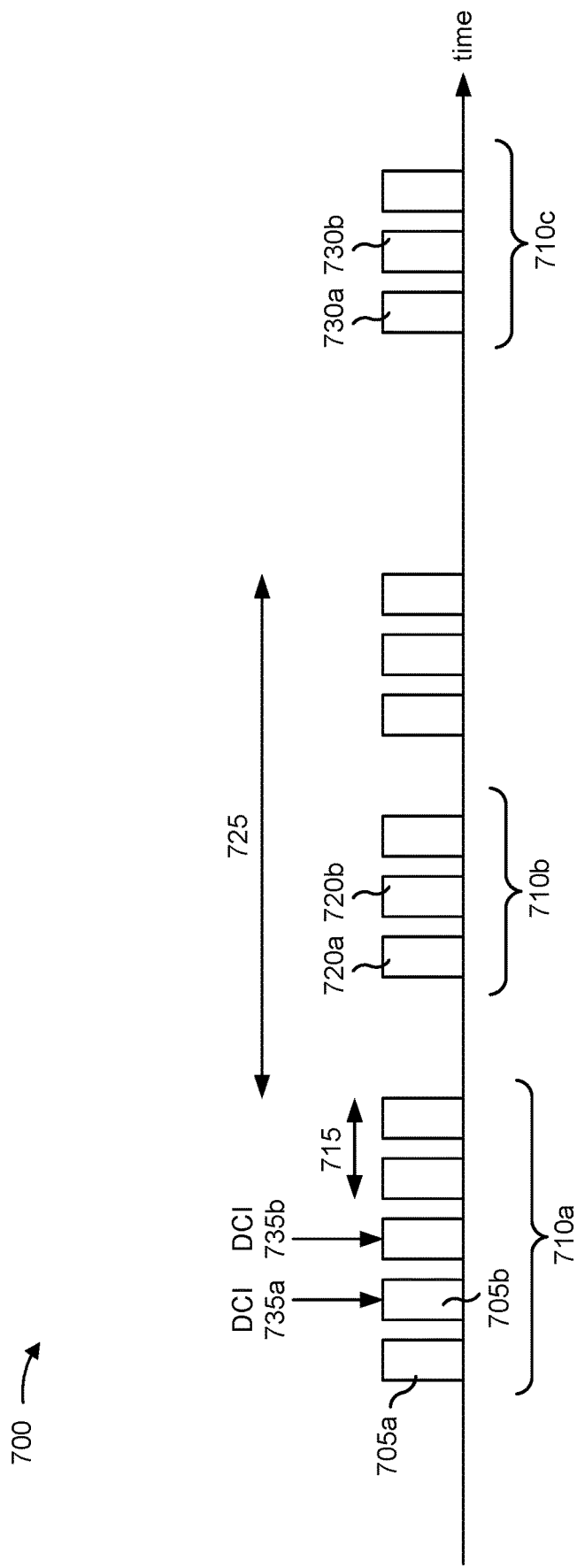

FIG. 7 is a diagram illustrating an example 700 associated with adaptive monitoring for control messages, in accordance with the present disclosure. Example 700 may be used by a UE (e.g., UE 120) to monitor for control messages (e.g., PDCCH communications) from a base station (e.g., base station 110). Accordingly, in some aspects, example 700 may be used during a DRX active state (e.g., DRX on duration 310, as described in connection with FIG. 3) for the UE 120.

As shown in FIG. 7, the UE 120 may monitor, within an activation period for a control channel associated with the UE 120, for messages from the base station 110 within one or more first monitoring occasions (e.g., occasions 705a, 705b, and so on) defined by a first monitoring pattern 710a. As described above, the activation period for the control channel may be a DRX active time for the UE 120.

In some aspects, as shown in FIG. 7, the first monitoring pattern 710a may include consecutive slots. The one or more first monitoring occasions may occupy some or all of each slot. Additionally, or alternatively, the first monitoring pattern 710a may include periodic slots. Accordingly, in some aspects, the UE 120 may monitor every other slot (e.g., periodicity of two), every third slot (e.g., periodicity of three), and so on (e.g., higher periodicities) in addition to, or in lieu of, monitoring consecutive slots.

As further shown in FIG. 7, the UE 120 may monitor, after expiry of a timer 715 associated with the first monitoring pattern, for messages from the base station 110 within one or more second monitoring occasions (e.g., occasions 720a, 720b, and so on) defined by a second monitoring pattern 710b. Similar to the one or more first monitoring occasions, the UE 120 may monitor for messages from the base station 110 within the one or more second monitoring occasions within the activation period for the control channel (e.g., within the DRX active time for the UE 120).

Moreover, in some aspects, the second monitoring pattern 710b may include consecutive slots and/or periodic slots, as described above. In some aspects, the first monitoring pattern 710a and the second monitoring pattern 710b may both include consecutive slots or may include periodic slots having the same periodicity. As an alternative, one of the first monitoring pattern 710a and the second monitoring pattern 710b may include consecutive slots, and the other of the first monitoring pattern 710a and the second monitoring pattern 710b may include periodic slots. As another alternative, one of the first monitoring pattern 710a and the second monitoring pattern 710b may include periodic slots associated with a shorter periodicity, and the other of the first monitoring pattern 710a and the second monitoring pattern 710b may include periodic slots associated with a longer periodicity.

As further shown in FIG. 7, the UE 120 may monitor, after expiry of a timer 725 associated with the second monitoring pattern 710b, for messages from the base station 110 within one or more third monitoring occasions (e.g., occasions 730a, 730b, and so on) defined by a third monitoring pattern 710c. Similar to the one or more second monitoring occasions, the UE 120 may monitor for messages from the base station 110 within the one or more third monitoring occasions within the activation period for the control channel (e.g., within the DRX active time for the UE 120).

Moreover, in some aspects, the third monitoring pattern 710c may include consecutive slots and/or periodic slots, as described above. In some aspects, the first monitoring pattern 710a, the second monitoring pattern 710b, and the third monitoring pattern 710c may all include consecutive slots or may all include periodic slots having the same periodicity. As an alternative, one or two of the first monitoring pattern 710a, the second monitoring pattern 710b, and the third monitoring pattern 710c may include consecutive slots, and the other(s) of the first monitoring pattern 710a, the second monitoring pattern 710b, and the third monitoring pattern 710c may include periodic slots. As another alternative, at least two of the first monitoring pattern 710a, the second monitoring pattern 710b, and the third monitoring pattern 710c may include periodic slots associated with different periodicities.

As further shown in FIG. 7, the one or more first monitoring occasions (e.g., occasions 705a, 705b, and so on) may be associated with a first periodicity, the one or more second monitoring occasions (e.g., occasions 720a, 720b, and so on) are associated with a second periodicity, and the second periodicity may be longer than the first periodicity. Additionally, as further shown in FIG. 7, the one or more third monitoring occasions (e.g., occasions 730a, 730b, and so on) may be associated with a third periodicity, and the third periodicity may be longer than the second periodicity. In example 700, the one or more first monitoring occasions are continuous or periodic slots that repeat until expiry of the timer 715. Accordingly, the first periodicity is zero. As an alternative, the one or more first monitoring occasions may be associated with a non-zero periodicity (e.g., as described in connection with FIG. 6).

As further shown in FIG. 7, the UE 120 may receive, while monitoring within the one or more first monitoring occasions, control information (e.g., DCI 735) from the base station 110. In some aspects, the control information may schedule a control message (e.g., a PDCCH communication) such that the base station 110 can transmit downlink data to the UE 120 (e.g., on a PDSCH). When the UE 120 receives the control information, the UE 120 may reset the timer 715 associated with the first monitoring pattern based at least in part on the control information. Accordingly, as long as the UE 120 continues receiving control information from the base station 110, the UE 120 will continue monitoring according to the first monitoring pattern 710a rather than the second monitoring pattern 710b. Accordingly, in example 700, the UE resets the timer 715 after receiving DCI 735a and after receiving DCI 735b.

In some aspects, the UE 120 may reset the timer 715 when the control information is associated with new data from the base station 110 and/or resources for the UE 120 to transmit new data (e.g., on an uplink with the base station 110). Accordingly, in some aspects, the UE 120 may refrain from resetting the timer 715 when the control information is associated with existing downlink data from the base station 110. For example, when the base station 110 transmits DCI to schedule a PDCCH communication for additional downlink data on the same PDSCH, the UE 120 may not reset the timer 715.

When the UE 120 receives, while monitoring within the one or more first monitoring occasions, no control information (e.g., DCI) from the base station 110 and/or control information not associated with new data from the base station 110 or resources for the UE 120 to transmit new data, the UE 120 may change from the first monitoring pattern 710a to the second monitoring pattern 710b. Additionally, as shown in FIG. 7, the UE 120 may begin the timer 725 associated with the second monitoring pattern 710b based at least in part on expiry of the timer 715 associated with the first monitoring pattern 710a.

In some aspects, the base station 110 may trigger the UE 120 to change from the first monitoring pattern 710a to the second monitoring pattern 710b regardless of the timer 715. For example, the UE 120 may receive, from the base station 110, control information (e.g., DCI) that indicates a change from the first monitoring pattern 710a to the second monitoring pattern 710b. In some aspects, the control information may include a field (e.g., a bit, an integer, or any other data structure) that indicates the change. The field may be defined by 3GPP specifications and/or another standard. Based at least in part on the control information, the UE 120 may monitor for messages from the base station 110 within the one or more second monitoring occasions defined by the second monitoring pattern 710b.

As further shown in FIG. 7, the UE 120 may receive, while monitoring the one or more second monitoring occasions, control information (e.g., DCI) from the base station 110. In some aspects, the control information may schedule a control message (e.g., a PDCCH communication) such that the base station 110 can transmit downlink data to the UE 120 (e.g., on a PDSCH). When the UE 120 receives the control information, the UE 120 may reset the timer 725 associated with the second monitoring pattern 710b based at least in part on the control information. Accordingly, as long as the UE 120 continues receiving control information from the base station 110, the UE 120 will continue monitoring according to the second monitoring pattern 710b rather than the third monitoring pattern 710c. As an alternative, when the UE 120 receives the control information, the UE 120 may change back to the first monitoring pattern 710a and begin the timer 715.

In some aspects, the UE 120 may reset the timer 725 (and/or change back to the first monitoring pattern and begin the timer 715) when the control information is associated with new data from the base station 110 and/or resources for the UE 120 to transmit new data (e.g., on an uplink with the base station 110). Accordingly, in some aspects, the UE 120 may refrain from resetting the timer 725 (and/or refrain from changing back to the first monitoring pattern and beginning the timer 715) when the control information is associated with existing downlink data from the base station 110. For example, when the base station 110 transmits DCI to schedule a PDCCH communication for additional downlink data on the same PDSCH, the UE 120 may not reset the timer 725. In some aspects, the UE 120 may reset the timer 725 when the control information is not associated with new data from the base station 110 and/or resources for the UE 120 to transmit new data, and may change back to the first monitoring pattern 710a and begin the timer 715 when the control information is associated with new data from the base station 110 and/or resources for the UE 120 to transmit new data.

When the UE 120 receives, while monitoring within the one or more second monitoring occasions, no control information (e.g., DCI) from the base station 110 and/or control information not associated with new data from the base station 110 or resources for the UE 120 to transmit new data, the UE 120 may change from the second monitoring pattern 710b to the third monitoring pattern 710c.

In some aspects, the base station 110 may trigger the UE 120 to change from the second monitoring pattern 710b to the third monitoring pattern 710c regardless of the timer 725. For example, the UE 120 may receive, from the base station 110, control information (e.g., DCI) that indicates a change from the second monitoring pattern 710b to the third monitoring pattern 710c. In some aspects, the control information may include a field (e.g., a bit, an integer, or any other data structure) that indicates the change. The field may be defined by 3GPP specifications and/or another standard. Based at least in part on the control information, the UE 120 may monitor for messages from the base station 110 within the one or more third monitoring occasions defined by the third monitoring pattern 710c.

In some aspects, the one or more first monitoring occasions, the one or more second monitoring occasions, and the one or more third monitoring occasions are all associated with a first USS. The UE 120 may be further configured for one or more additional USSs, such as one or more monitoring occasions associated with a second USS. The second USS may be associated with a periodicity that is an integer multiple of a periodicity of the second monitoring pattern and a periodicity of the third monitoring pattern. Accordingly, the UE 120 may exit the activation period for the control channel associated with the UE 120 (e.g., enter a DRX sleep state 315, as described in connection with FIG. 3) without disrupting the periodicities of the USSs. Additionally, the second USS and the first USS may be associated with a same start offset. Accordingly, the UE 120 may begin monitoring both USSs when re-entering the activation period for the control channel associated with the UE 120.

By using adaptive monitoring as described in connection with FIG. 7, the UE 120 may adaptively monitor for control messages (e.g., PDCCH communications) from the base station 110. Accordingly, the UE 120 may monitor with increased frequency when the base station 110 is transmitting downlink data, in order to reduce latency. Moreover, the UE 120 may monitor with decreased frequency when the base station 110 is not and has not been, for one or more occasions, transmitting downlink data, in order to conserve processing resources and extend battery life. In some aspects, the base station 110 may use control information (e.g., DCI) to switch the UE 120 between more frequent monitoring and less frequent monitoring. Accordingly, the base station 110 may use control information as described herein to reduce latency and/or reduce power and processing resource consumption of the UE 120.

As indicated above, FIG. 7 is provided as an example. Other examples may differ from what is described with respect to FIG. 7.

Figure 8:
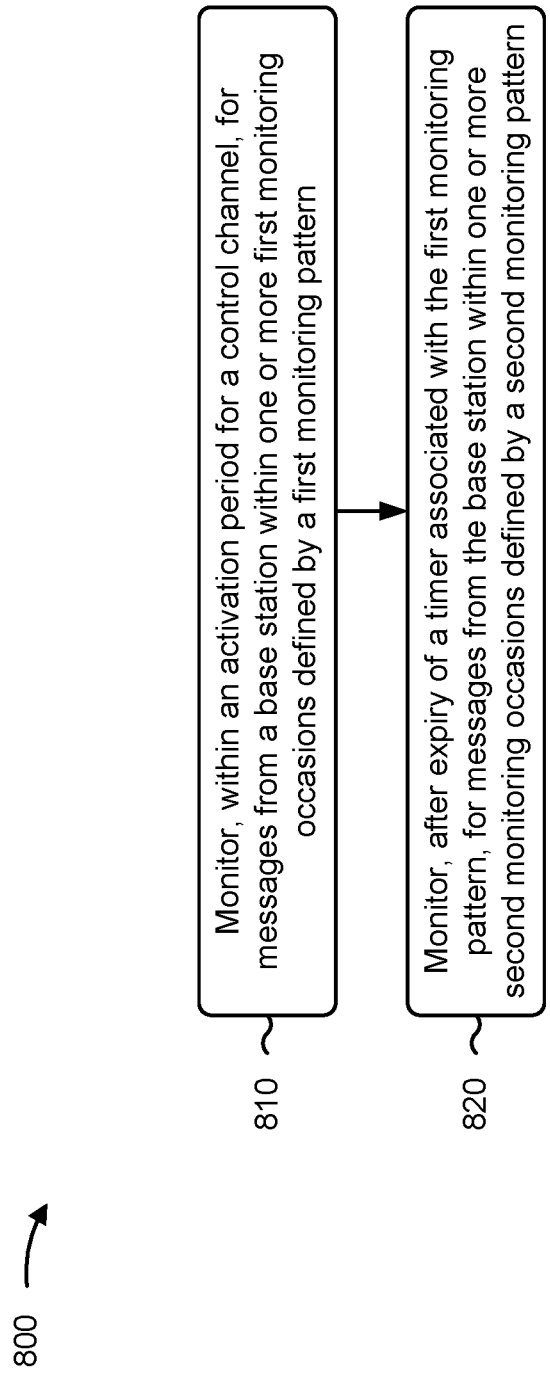
FIGS. 8 and 9 are diagrams illustrating example processes associated with adaptive monitoring for control messages, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with adaptive monitoring for control messages.

As shown in FIG. 8, in some aspects, process 800 may include monitoring, within an activation period for a control channel associated with the UE, for messages from a base station (e.g., base station 110 and/or apparatus 1100 of FIG. 11) within one or more first monitoring occasions defined by a first monitoring pattern (block 810). For example, the UE (e.g., using monitoring component 1008, depicted in FIG. 10) may monitor, within an activation period for a control channel associated with the UE, for messages from a base station within one or more first monitoring occasions defined by a first monitoring pattern, as described herein.

As further shown in FIG. 8, in some aspects, process 800 may include monitoring, after expiry of a timer associated with the first monitoring pattern, for messages from the base station within one or more second monitoring occasions defined by a second monitoring pattern (block 820). For example, the UE (e.g., using monitoring component 1008) may monitor, after expiry of a timer associated with the first monitoring pattern, for messages from the base station within one or more second monitoring occasions defined by a second monitoring pattern, as described herein.

Process 800 may include additional aspects, such as any single aspect or any combination of aspects described below and/or in connection with one or more other processes described elsewhere herein.

In a first aspect, the activation period for the control channel is a DRX active time for the UE.

In a second aspect, alone or in combination with the first aspect, the one or more first monitoring occasions include consecutive slots.

In a third aspect, alone or in combination with one or more of the first and second aspects, the one or more first monitoring occasions are associated with a first periodicity, the one or more second monitoring occasions are associated with a second periodicity, and the second periodicity is longer than the first periodicity.

In a fourth aspect, alone or in combination with one or more of the first through third aspects, the first periodicity is zero.

In a fifth aspect, alone or in combination with one or more of the first through fourth aspects, process 800 further includes receiving (e.g., using reception component 1002, depicted in FIG. 10), while monitoring within the one or more first monitoring occasions, control information from the base station, and resetting (e.g., using timing component 1010, depicted in FIG. 10) the timer associated with the first monitoring pattern based at least in part on the control information.

In a sixth aspect, alone or in combination with one or more of the first through fifth aspects, the timer is reset when the control information is associated with new data from the base station or resources for the UE to transmit new data.

In a seventh aspect, alone or in combination with one or more of the first through sixth aspects, process 800 further includes receiving (e.g., using reception component 1002), from the base station, control information that indicates a change from the first monitoring pattern to the second monitoring pattern, and monitoring (e.g., using monitoring component 1008), based at least in part on the control information, for messages from the base station within the one or more second monitoring occasions defined by the second monitoring pattern.

In an eighth aspect, alone or in combination with one or more of the first through seventh aspects, the control information includes a field that indicates the change from the first monitoring pattern to the second monitoring pattern.

In a ninth aspect, alone or in combination with one or more of the first through eighth aspects, the one or more first monitoring occasions include periodic slots.

In a tenth aspect, alone or in combination with one or more of the first through ninth aspects, the one or more first monitoring occasions include a first burst associated with a first periodicity, the one or more second monitoring occasions include a second burst associated with a second periodicity, and the second periodicity is longer than the first periodicity.

In an eleventh aspect, alone or in combination with one or more of the first through tenth aspects, the first burst includes a same number of occasions as the second burst.

In a twelfth aspect, alone or in combination with one or more of the first through eleventh aspects, the timer associated with the first monitoring pattern is set to an integer multiple of the first periodicity.

In a thirteenth aspect, alone or in combination with one or more of the first through twelfth aspects, process 800 further includes receiving (e.g., using reception component 1002), while monitoring within the first burst, control information from the base station, and resetting (e.g., using timing component 1010), after an end of the first burst, the timer associated with the first monitoring pattern based at least in part on the control information.

In a fourteenth aspect, alone or in combination with one or more of the first through thirteenth aspects, the timer is reset when the control information is associated with new data from the base station or resources for the UE to transmit new data.

In a fifteenth aspect, alone or in combination with one or more of the first through fourteenth aspects, process 800 further includes monitoring (e.g., using monitoring component 1008), after expiry of a timer associated with the second monitoring pattern, for messages from the base station within one or more third monitoring occasions defined by a third monitoring pattern.

In a sixteenth aspect, alone or in combination with one or more of the first through fifteenth aspects, process 800 further includes receiving (e.g., using reception component 1002), while monitoring within the one or more first monitoring occasions, control information from the base station, and resetting (e.g., using timing component 1010) the timer associated with the first monitoring pattern based at least in part on the control information.

In a seventeenth aspect, alone or in combination with one or more of the first through sixteenth aspects, the timer is reset when the control information is associated with new data from the base station or resources for the UE to transmit new data.

In an eighteenth aspect, alone or in combination with one or more of the first through seventeenth aspects, process 800 further includes receiving (e.g., using reception component 1002), while monitoring within the one or more first monitoring occasions, no control information from the base station, and beginning (e.g., using timing component 1010) the timer associated with the second monitoring pattern based at least in part on expiry of the timer associated with the first monitoring pattern.

In a nineteenth aspect, alone or in combination with one or more of the first through eighteenth aspects, process 800 further includes receiving (e.g., using reception component 1002), from the base station, control information that indicates a change from the second monitoring pattern to the third monitoring pattern, and monitoring (e.g., using monitoring component 1008), based at least in part on the control information, for messages from the base station within the one or more third monitoring occasions defined by the third monitoring pattern.

In a twentieth aspect, alone or in combination with one or more of the first through nineteenth aspects, the one or more first monitoring occasions and the one or more second monitoring occasions are both associated with a first USS.

In a twenty-first aspect, alone or in combination with one or more of the first through twentieth aspects, process 800 further includes monitoring (e.g., using monitoring component 1008) for messages from the base station within one or more monitoring occasions associated with a second USS, the second USS being associated with a periodicity that is an integer multiple of a periodicity of the first monitoring pattern and a periodicity of the second monitoring pattern, and the second USS and the first USS being associated with a same start offset.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
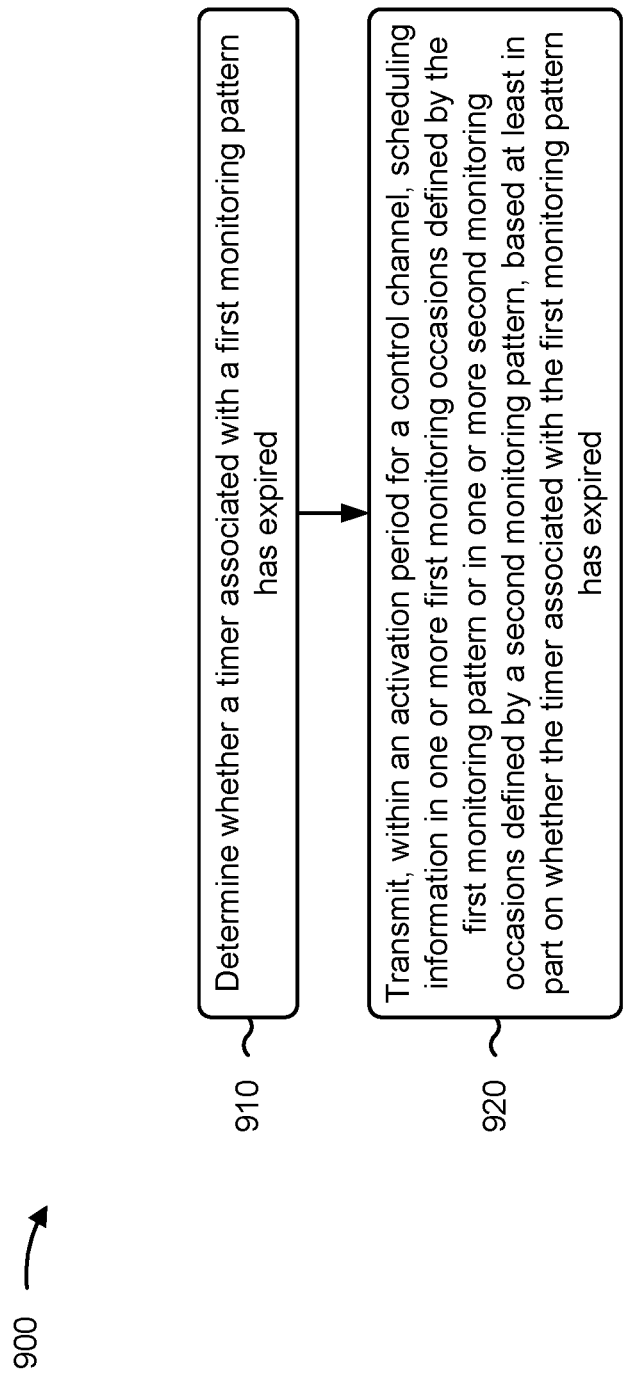

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with adaptive monitoring for control messages.

As shown in FIG. 9, in some aspects, process 900 may include determining whether a timer associated with a first monitoring pattern has expired (block 910). For example, the base station (e.g., using determination component 1108, depicted in FIG. 11) may determine whether a timer associated with a first monitoring pattern has expired, as described herein.

As further shown in FIG. 9, in some aspects, process 900 may include transmitting, to a UE (e.g., UE 120 and/or apparatus 1000 of FIG. 10) and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired (block 920). For example, the base station (e.g., using transmission component 1104, depicted in FIG. 11) may transmit, to a UE and within an activation period for a control channel associated with the UE, scheduling information in one or more first monitoring occasions defined by the first monitoring pattern or in one or more second monitoring occasions defined by a second monitoring pattern, based at least in part on whether the timer associated with the first monitoring pattern has expired, as described herein.

Process 900 may include additional aspects, such as any single aspect or any combination of aspects described below and/or in connection with one or more other processes described elsewhere herein.

In a first aspect, the activation period for the control channel is a DRX active time for the UE.

In a second aspect, alone or in combination with the first aspect, the one or more first monitoring occasions include consecutive slots.

In a third aspect, alone or in combination with one or more of the first and second aspects, the one or more first monitoring occasions are associated with a first periodicity, the one or more second monitoring occasions are associated with a second periodicity, and the second periodicity is longer than the first periodicity.

In a fourth aspect, alone or in combination with one or more of the first through third aspects, the first periodicity is zero.

In a fifth aspect, alone or in combination with one or more of the first through fourth aspects, process 900 further includes resetting (e.g., using timing component 1110, depicted in FIG. 11) the timer associated with the first monitoring pattern when transmitting the scheduling information in the one or more first monitoring occasions.

In a sixth aspect, alone or in combination with one or more of the first through fifth aspects, the timer is reset when the scheduling information is associated with new data from the base station or resources for the UE to transmit new data.

In a seventh aspect, alone or in combination with one or more of the first through sixth aspects, process 900 further includes transmitting (e.g., using transmission component 1104), to the UE, control information that indicates a change from the first monitoring pattern to the second monitoring pattern, and transmitting (e.g., using transmission component 1104), based at least in part on the control information, the scheduling information in the one or more second monitoring occasions.

In an eighth aspect, alone or in combination with one or more of the first through seventh aspects, the control information includes a field that indicates the change from the first monitoring pattern to the second monitoring pattern.

In a ninth aspect, alone or in combination with one or more of the first through eighth aspects, the one or more first monitoring occasions include periodic slots.

In a tenth aspect, alone or in combination with one or more of the first through ninth aspects, the one or more first monitoring occasions include a first burst associated with a first periodicity, the one or more second monitoring occasions include a second burst associated with a second periodicity, and the second periodicity is longer than the first periodicity.

In an eleventh aspect, alone or in combination with one or more of the first through tenth aspects, the first burst includes a same number of occasions as the second burst.

In a twelfth aspect, alone or in combination with one or more of the first through eleventh aspects, the timer associated with the first monitoring pattern is set to an integer multiple of the first periodicity.

In a thirteenth aspect, alone or in combination with one or more of the first through twelfth aspects, process 900 further includes resetting (e.g., using timing component 1110) the timer associated with the first monitoring pattern when transmitting the scheduling information in the first burst.

In a fourteenth aspect, alone or in combination with one or more of the first through thirteenth aspects, the timer is reset when the scheduling information is associated with new data from the base station or resources for the UE to transmit new data.

In a fifteenth aspect, alone or in combination with one or more of the first through fourteenth aspects, process 900 further includes determining (e.g., using determination component 1108) whether a timer associated with the second monitoring pattern has expired, and transmitting (e.g., using transmission component 1104), to the UE, the scheduling information in one or more third monitoring occasions defined by a third monitoring pattern, based at least in part on whether the timer associated with the second monitoring pattern has expired.

In a sixteenth aspect, alone or in combination with one or more of the first through fifteenth aspects, process 900 further includes resetting (e.g., using timing component 1110) the timer associated with the first monitoring pattern when transmitting the scheduling information in the one or more first monitoring occasions.

In a seventeenth aspect, alone or in combination with one or more of the first through sixteenth aspects, the timer is reset when the scheduling information is associated with new data from the base station or resources for the UE to transmit new data.

In an eighteenth aspect, alone or in combination with one or more of the first through seventeenth aspects, process 900 further includes beginning (e.g., using timing component 1110) the timer associated with the second monitoring pattern based at least in part on expiry of the timer associated with the first monitoring pattern.

In a nineteenth aspect, alone or in combination with one or more of the first through eighteenth aspects, process 900 further includes transmitting (e.g., using transmission component 1104), to the UE, control information that indicates a change from the second monitoring pattern to a third monitoring pattern, and transmitting (e.g., using transmission component 1104), based at least in part on the control information, the scheduling information in the one or more third monitoring occasions.

In a twentieth aspect, alone or in combination with one or more of the first through nineteenth aspects, the one or more first monitoring occasions and the one or more second monitoring occasions are both associated with a first USS.

In a twenty-first aspect, alone or in combination with one or more of the first through twentieth aspects, process 900 further includes transmitting (e.g., using transmission component 1104), to the UE, scheduling information in one or more monitoring occasions defined by a second USS, the second USS being associated with a periodicity that is an integer multiple of a periodicity of the first monitoring pattern and a periodicity of the second monitoring pattern, and the second USS and the first USS being associated with a same start offset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
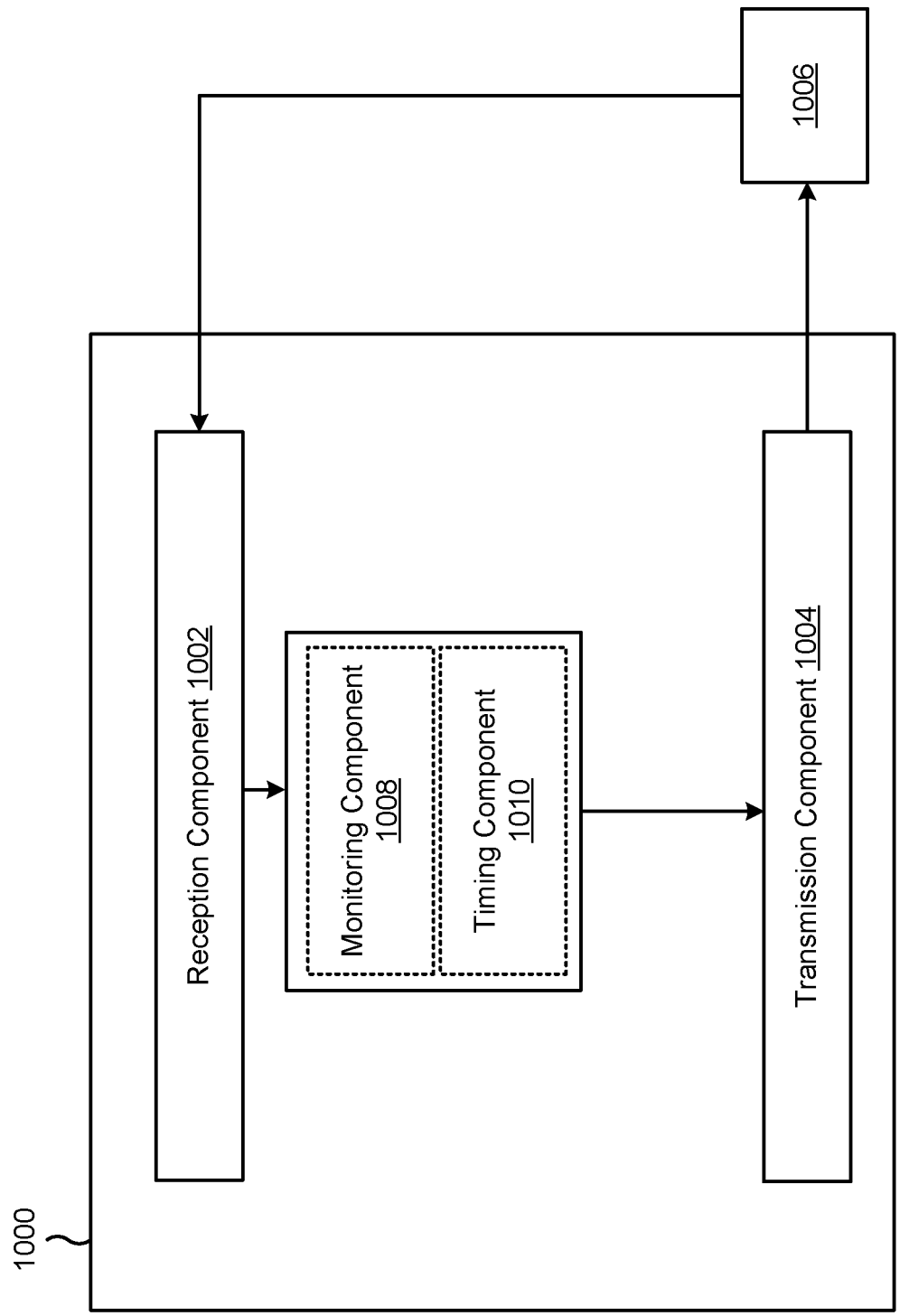
FIGS. 10 and 11 are diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a monitoring component 1008 and/or a timing component 1010, among other examples.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the monitoring component 1008 may monitor, within an activation period for a control channel associated with the apparatus 1000, for messages from the apparatus 1006 within one or more first monitoring occasions defined by a first monitoring pattern. In some aspects, the monitoring component 1008 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The monitoring component 1008 may further monitor, after expiry of a timer associated with the first monitoring pattern, for messages from the apparatus 1006 within one or more second monitoring occasions defined by a second monitoring pattern.

In some aspects, the reception component 1002 may receive, while monitoring within the one or more first monitoring occasions, control information from the apparatus 1006. Accordingly, the timing component 1010 may reset the timer associated with the first monitoring pattern based at least in part on the reception component 1002 receiving the control information. The timing component 1010 may include a receive processor, a transmit MIMO processor, a transmit processor, a controller/processor, a memory, or a combination thereof, of the UE described above in connection with FIG. 2. In some aspects, the timing component 1010 may reset the timer when the control information is associated with new data from the apparatus 1006 or resources for the apparatus 1000 to transmit new data.

In some aspects, the reception component 1002 may receive, from the apparatus 1006, control information that indicates a change from the first monitoring pattern to the second monitoring pattern. Accordingly, the monitoring component 1008 may monitor, based at least in part on the control information, for messages from the apparatus 1006 within the one or more second monitoring occasions defined by the second monitoring pattern. In some aspects, the control information may include a field that indicates the change from the first monitoring pattern to the second monitoring pattern.

In some aspects, the one or more first monitoring occasions include a first burst associated with a first periodicity, the one or more second monitoring occasions include a second burst associated with a second periodicity, and the second periodicity is longer than the first periodicity. Accordingly, the reception component 1002 may receive, while monitoring within the first burst, control information from the apparatus 1006. Additionally, the timing component 1010 may reset, after an end of the first burst, the timer associated with the first monitoring pattern based at least in part on the control information. In some aspects, the timing component 1010 may reset the timer when the control information is associated with new data from the apparatus 1006 or resources for the apparatus 1000 to transmit new data.

In some aspects, the monitoring component 1008 may monitor, after expiry of a timer associated with the second monitoring pattern, for messages from the apparatus 1006 within one or more third monitoring occasions defined by a third monitoring pattern. In some aspects, the reception component 1002 may receive, while monitoring within the one or more first monitoring occasions, no control information from the apparatus 1006, and the timing component 1010 may begin the timer associated with the second monitoring pattern based at least in part on expiry of the timer associated with the first monitoring pattern. Additionally, or alternatively, the reception component 1002 may receive, from the apparatus 1006, control information that indicates a change from the second monitoring pattern to the third monitoring pattern, and the monitoring component 1008 may monitor, based at least in part on the control information, for messages from the apparatus 1006 within the one or more third monitoring occasions defined by the third monitoring pattern.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
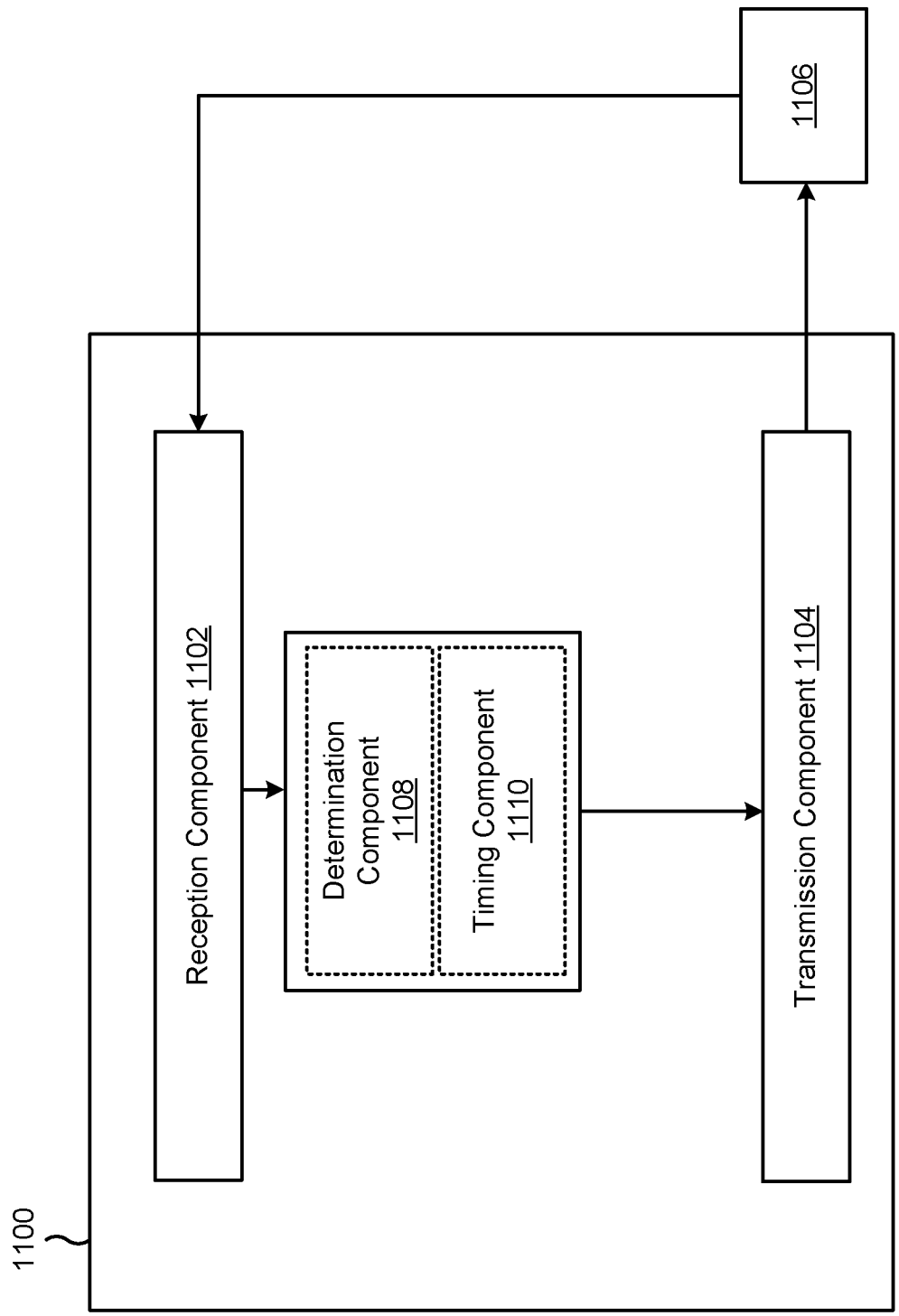

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108 and/or a timing component 1110, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the determination component 1108 may determine whether a timer associated with a first monitoring pattern has expired. In some aspects, the determination component 1108 may include a receive processor, a transmit MIMO processor, a transmit processor, a controller/processor, a memory, or a combination thereof, of the base station described above in connection with FIG. 2. The transmission component 1104 may transmit, to the apparatus 1106 and within an activation period for a control channel associated with the apparatus 1106, scheduling information in one or more first monitoring occasions defined by the first monitoring pattern or in one or more second monitoring occasions defined by a second monitoring pattern, based at least in part on the determination by the determination component 1108.

In some aspects, the timing component 1110 may reset the timer associated with the first monitoring pattern when transmitting the scheduling information in the one or more first monitoring occasions. The timing component 1010 may include a receive processor, a transmit MIMO processor, a transmit processor, a controller/processor, a memory, or a combination thereof, of the base station described above in connection with FIG. 2. In some aspects, the timing component 1010 may reset the timer when the control information is associated with new data from the apparatus 1100 or resources for the apparatus 1106 to transmit new data.

In some aspects, the transmission component 1104 may transmit, to the apparatus 1106, control information that indicates a change from the first monitoring pattern to the second monitoring pattern. Additionally, the transmission component 1104 may transmit, based at least in part on the control information, the scheduling information in the one or more second monitoring occasions. In some aspects, the control information may include a field that indicates the change from the first monitoring pattern to the second monitoring pattern.

In some aspects, the one or more first monitoring occasions include a first burst associated with a first periodicity, the one or more second monitoring occasions include a second burst associated with a second periodicity, and the second periodicity is longer than the first periodicity. Accordingly, the timing component 1110 may reset the timer associated with the first monitoring pattern when transmitting the scheduling information in the first burst. In some aspects, the timing component 1110 may reset the timer when the control information is associated with new data from the apparatus 1100 or resources for the apparatus 1106 to transmit new data.

In some aspects, the determination component 1108 may determine whether a timer associated with the second monitoring pattern has expired, and the transmission component 1104 may transmit, to the apparatus 1106, the scheduling information in one or more third monitoring occasions defined by a third monitoring pattern, based at least in part on whether the timer associated with the second monitoring pattern has expired. Additionally, in some aspects, the timing component 1110 may begin the timer associated with the second monitoring pattern based at least in part on expiry of the timer associated with the first monitoring pattern.

In some aspects, the transmission component 1104 may transmit, to the apparatus 1106, control information that indicates a change from the second monitoring pattern to a third monitoring pattern, and may transmit, based at least in part on the control information, the scheduling information in the one or more third monitoring occasions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: monitoring, within an activation period for a control channel associated with the UE, for messages from a base station within one or more first monitoring occasions defined by a first monitoring pattern; and monitoring, after expiry of a timer associated with the first monitoring pattern, for messages from the base station within one or more second monitoring occasions defined by a second monitoring pattern.

Aspect 2: The method of Aspect 1, wherein the activation period for the control channel is a discontinuous reception (DRX) active time for the UE.

Aspect 3: The method of any of Aspects 1 through 2, wherein the one or more first monitoring occasions include consecutive slots.

Aspect 4: The method of any of Aspects 1 through 3, wherein the one or more first monitoring occasions are associated with a first periodicity, the one or more second monitoring occasions are associated with a second periodicity, and the second periodicity is longer than the first periodicity.

Aspect 5: The method of Aspect 4, wherein the first periodicity is zero.

Aspect 6: The method of any of Aspects 1 through 5, further comprising: receiving, while monitoring within the one or more first monitoring occasions, control information from the base station; and resetting the timer associated with the first monitoring pattern based at least in part on the control information.

Aspect 7: The method of Aspect 6, wherein the timer associated with the first monitoring pattern is reset when the control information is associated with new data from the base station or resources for the UE to transmit new data.

Aspect 8: The method of any of Aspects 1 through 7, further comprising: receiving, from the base station, control information that indicates a change from the first monitoring pattern to the second monitoring pattern; and monitoring, based at least in part on the control information, for messages from the base station within the one or more second monitoring occasions defined by the second monitoring pattern.

Aspect 9: The method of Aspect 8, wherein the control information includes a field that indicates the change from the first monitoring pattern to the second monitoring pattern.

Aspect 10: The method of any of Aspects 1 through 9, wherein the one or more first monitoring occasions include periodic slots.

Aspect 11: The method of any of Aspects 1 through 11, wherein the one or more first monitoring occasions include a first burst associated with a first periodicity, the one or more second monitoring occasions include a second burst associated with a second periodicity, and the second periodicity is longer than the first periodicity.

Aspect 12: The method of Aspect 11, wherein the first burst includes a same number of occasions as the second burst.

Aspect 13: The method of any of Aspects 11 through 12, wherein the timer associated with the first monitoring pattern is set to an integer multiple of the first periodicity.

Aspect 14: The method of any of Aspects 11 through 13, further comprising: receiving, while monitoring within the first burst, control information from the base station; and resetting, after an end of the first burst, the timer associated with the first monitoring pattern based at least in part on the control information.

Aspect 15: The method of Aspect 14, wherein the timer associated with the first monitoring pattern is reset when the control information is associated with new data from the base station or resources for the UE to transmit new data.

Aspect 16: The method of any of Aspects 1 through 15, further comprising: monitoring, after expiry of a timer associated with the second monitoring pattern, for messages from the base station within one or more third monitoring occasions defined by a third monitoring pattern.

Aspect 17: The method of Aspect 16, further comprising: receiving, while monitoring within the one or more first monitoring occasions, control information from the base station; and resetting the timer associated with the first monitoring pattern based at least in part on the control information.

Aspect 18: The method of Aspect 17, wherein the timer associated with the first monitoring pattern is reset when the control information is associated with new data from the base station or resources for the UE to transmit new data.

Aspect 19: The method of any of Aspects 16 through 18, further comprising: receiving, while monitoring within the one or more first monitoring occasions, no control information from the base station; and beginning the timer associated with the second monitoring pattern based at least in part on expiry of the timer associated with the first monitoring pattern.

Aspect 20: The method of any of Aspects 16 through 19, further comprising: receiving, from the base station, control information that indicates a change from the second monitoring pattern to the third monitoring pattern; and monitoring, based at least in part on the control information, for messages from the base station within the one or more third monitoring occasions defined by the third monitoring pattern.

Aspect 21: The method of any of Aspects 1 through 20, wherein the one or more first monitoring occasions and the one or more second monitoring occasions are both associated with a first UE-specific search space (USS).

Aspect 22: The method of Aspect 21, further comprising: monitoring for messages from the base station within one or more monitoring occasions associated with a second USS, wherein the second USS is associated with a periodicity that is an integer multiple of a periodicity of the first monitoring pattern and a periodicity of the second monitoring pattern, and the second USS and the first USS are associated with a same start offset.

Aspect 23: A method of wireless communication performed by a base station, comprising: determining whether a timer associated with a first monitoring pattern has expired; and transmitting, to a user equipment (UE) and within an activation period for a control channel associated with UE, scheduling information in one or more first monitoring occasions defined by the first monitoring pattern or in one or more second monitoring occasions defined by a second monitoring pattern, based at least in part on whether the timer associated with the first monitoring pattern has expired.

Aspect 24: The method of Aspect 23, wherein the activation period for the control channel is a discontinuous reception (DRX) active time for the UE.

Aspect 25: The method of any of Aspects 23 through 24, wherein the one or more first monitoring occasions include consecutive slots.

Aspect 26: The method of any of Aspects 23 through 25, wherein the one or more first monitoring occasions are associated with a first periodicity, the one or more second monitoring occasions are associated with a second periodicity, and the second periodicity is longer than the first periodicity.

Aspect 27: The method of Aspect 26, wherein the first periodicity is zero.

Aspect 28: The method of any of Aspects 23 through 27, further comprising: resetting the timer associated with the first monitoring pattern when transmitting the scheduling information in the one or more first monitoring occasions.

Aspect 29: The method of Aspect 28, wherein the timer associated with the first monitoring pattern is reset when the scheduling information is associated with new data from the base station or resources for the UE to transmit new data.

Aspect 30: The method of any of Aspects 23 through 29, further comprising: transmitting, to the UE, control information that indicates a change from the first monitoring pattern to the second monitoring pattern; and transmitting, based at least in part on the control information, the scheduling information in the one or more second monitoring occasions.

Aspect 31: The method of Aspect 30, wherein the control information includes a field that indicates the change from the first monitoring pattern to the second monitoring pattern.

Aspect 32: The method of any of Aspects 23 through 31, wherein the one or more first monitoring occasions include periodic slots.

Aspect 33: The method of any of Aspects 23 through 32, wherein the one or more first monitoring occasions include a first burst associated with a first periodicity, the one or more second monitoring occasions include a second burst associated with a second periodicity, and the second periodicity is longer than the first periodicity.

Aspect 34: The method of Aspect 33, wherein the first burst includes a same number of occasions as the second burst.

Aspect 35: The method of any of Aspects 33 through 34, wherein the timer associated with the first monitoring pattern is set to an integer multiple of the first periodicity.

Aspect 36: The method of any of Aspects 33 through 36, further comprising: resetting the timer associated with the first monitoring pattern when transmitting the scheduling information in the first burst.

Aspect 37: The method of Aspect 36, wherein the timer associated with the first monitoring pattern is reset when the scheduling information is associated with new data from the base station or resources for UE to transmit new data.

Aspect 38: The method of any of Aspects 23 through 37, further comprising: determining whether a timer associated with the second monitoring pattern has expired; and transmitting, to the UE, the scheduling information in one or more third monitoring occasions defined by a third monitoring pattern, based at least in part on whether the timer associated with the second monitoring pattern has expired.

Aspect 39: The method of Aspect 38, further comprising: resetting the timer associated with the first monitoring pattern when transmitting the scheduling information in the one or more first monitoring occasions.

Aspect 40: The method of Aspect 39, wherein the timer associated with the first monitoring pattern is reset when the scheduling information is associated with new data from the base station or resources for the UE to transmit new data.

Aspect 41: The method of any of Aspects 38 through 40, further comprising: beginning the timer associated with the second monitoring pattern based at least in part on expiry of the timer associated with the first monitoring pattern.

Aspect 42: The method of any of Aspects 38 through 41, further comprising: transmitting, to the UE, control information that indicates a change from the second monitoring pattern to the third monitoring pattern; and transmitting, based at least in part on the control information, the scheduling information in the one or more third monitoring occasions.

Aspect 43: The method of any of Aspects 23 through 42, wherein the one or more first monitoring occasions and the one or more second monitoring occasions are both associated with a first UE-specific search space (USS).

Aspect 44: The method of Aspect 43, further comprising: transmitting, to the UE, additional scheduling information in one or more monitoring occasions defined by a second USS, wherein the second USS is associated with a periodicity that is an integer multiple of a periodicity of the first monitoring pattern and a periodicity of the second monitoring pattern, and the second USS and the first USS are associated with a same start offset.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories;
   one or more processors, the one or more processors, individually or collectively and based at least in part on information stored in the one or more memories, being configured to:
      receive, from a network entity, a discontinuous reception (DRX) configuration to configure a DRX cycle;
      monitor, within an activation period for a control channel, for messages from the network entity within one or more first monitoring occasions defined by a first monitoring pattern, wherein the one or more first monitoring occasions are associated with a first periodicity, wherein a first timer associated with the first monitoring pattern is an integer multiple of the first periodicity, and wherein the first monitoring pattern includes periodic slots;
      monitor, after expiry of the first timer, for messages from the network entity within one or more second monitoring occasions defined by a second monitoring pattern, wherein the second monitoring pattern includes periodic slots, and wherein the one or more second monitoring occasions and the one or more first monitoring occasions are both associated with a first UE-specific search space (USS) of a plurality of USSs associated with a same start offset;
      monitor for messages from the network entity within one or more monitoring occasions associated with a second USS of the plurality of USSs, wherein the second USS is associated with a periodicity that is an integer multiple of a second periodicity of the second monitoring pattern and a third periodicity of a third monitoring pattern; and
      monitor, after expiry of a second timer associated with the second monitoring pattern, for messages from the network entity within one or more third monitoring occasions defined by the third monitoring pattern, the one or more third monitoring occasions being included within the activation period associated with the one or more first monitoring occasions.

2. The apparatus of claim 1, wherein the activation period for the control channel is a DRX active time for the UE.

3. The apparatus of claim 1, wherein the one or more second monitoring occasions include consecutive occasions.

4. The apparatus of claim 1, wherein the one or more processors are further configured to:
   receive, while monitoring within the one or more first monitoring occasions, control information from the network entity; and
   reset the first timer based at least in part on the control information.

5. The apparatus of claim 4, wherein the first timer is reset when the control information is associated with new data from the network entity or resources for the UE to transmit new data.

6. The apparatus of claim 1, wherein the one or more processors, to monitor for messages from the network entity within one or more second monitoring occasions, are further configured to:
   receive, from the network entity, control information that indicates a change from the first monitoring pattern to the second monitoring pattern; and
   monitor, based at least in part on the control information, for messages from the network entity within the one or more second monitoring occasions.

7. The apparatus of claim 6, wherein the control information includes a field that indicates the change from the first monitoring pattern to the second monitoring pattern.

8. The apparatus of claim 1, wherein the one or more first monitoring occasions include a first burst associated with the first periodicity, the one or more second monitoring occasions include a second burst associated with the second periodicity, and the second periodicity is longer than the first periodicity.

9. The apparatus of claim 8, wherein the first burst includes a same number of occasions as the second burst.

10. The apparatus of claim 8, wherein the one or more processors are further configured to:
    receive, while monitoring within the first burst, control information from the network entity; and
    reset, after an end of the first burst, the first timer based at least in part on the control information.

11. The apparatus of claim 10, wherein the first timer is reset when the control information is associated with new data from the network entity or resources for the UE to transmit new data.

12. The apparatus of claim 1, wherein the one or more third monitoring occasions are associated with a third periodicity longer than the second periodicity.

13. The apparatus of claim 12, wherein the one or more processors are further configured to:
    receive, while monitoring within the one or more first monitoring occasions, control information from the network entity; and
    reset the first timer based at least in part on the control information.

14. The apparatus of claim 13, wherein the first timer is reset when the control information is associated with new data from the network entity or resources for the UE to transmit new data.

15. The apparatus of claim 12, wherein the one or more processors are further configured to:
receive, while monitoring within the one or more first monitoring occasions, no control information from the network entity; and
begin the second timer based at least in part on expiry of the first timer.

16. The apparatus of claim 12, wherein the one or more processors are further configured to:
receive, from the network entity, control information that indicates a change from the second monitoring pattern to the third monitoring pattern; and
monitor, based at least in part on the control information, for messages from the network entity within the one or more third monitoring occasions defined by the third monitoring pattern.

17. An apparatus for wireless communication at a network entity, comprising:
one or more memories;
one or more processors, the one or more processors, individually or collectively and based at least in part on information stored in the one or more memories, being configured to:
transmit, to a user equipment (UE), a discontinuous reception (DRX) configuration to configure a DRX cycle; and
transmit, to the user equipment (UE) and within an activation period for a control channel associated with the UE, scheduling information in one or more first monitoring occasions defined by a first monitoring pattern or in one or more second monitoring occasions defined by a second monitoring pattern, based at least in part on whether a first timer associated with the first monitoring pattern has expired, the one or more first monitoring occasions and the one or more second monitoring occasions being associated with different periodicities, wherein the one or more first monitoring occasions are associated with a first periodicity, wherein the first timer is set to an integer multiple of the first periodicity;
transmit, to the UE, the scheduling information in one or more third monitoring occasions defined by a third monitoring pattern, based at least in part on whether a second timer associated with the second monitoring pattern has expired, wherein the one or more first monitoring occasions, the one or more second monitoring occasions, and the one or more third monitoring occasions are all associated with a first UE-specific search space (USS), the one or more second monitoring occasions and the one or more third monitoring occasions being included within the activation period; and
transmit, to the UE, additional scheduling information in one or more monitoring occasions defined by a second USS, wherein the second USS is associated with a periodicity that is an integer multiple of a second periodicity of the second monitoring pattern and a third periodicity of the third monitoring pattern.

18. The apparatus of claim 17, wherein the one or more processors are further configured to:
reset the first timer when transmitting the scheduling information in the one or more first monitoring occasions.

19. The apparatus of claim 18, wherein the first timer is reset when the scheduling information is associated with new data from the network entity or resources for the UE to transmit new data.

20. The apparatus of claim 17, wherein the one or more processors are further configured to:
begin the second timer based at least in part on expiry of the first timer.

21. The apparatus of claim 17, wherein the second USS and the first USS are associated with a same start offset, wherein the UE begins monitoring the plurality of USSs when re-entering the activation period in accordance with the same start offset.

22. A method of wireless communication performed by a user equipment (UE), comprising:
receiving, from a network entity, a discontinuous reception (DRX) configuration to configure a DRX cycle;
monitoring, within an activation period for a control channel, for messages from the network entity within one or more first monitoring occasions defined by a first monitoring pattern, wherein the one or more first monitoring occasions are associated with a first periodicity, wherein a first timer associated with the first monitoring pattern is an integer multiple of the first periodicity, and wherein the first monitoring pattern includes periodic slots;
monitoring, after expiry of the first timer, for messages from the network entity within one or more second monitoring occasions defined by a second monitoring pattern, wherein the second monitoring pattern includes periodic slots, and wherein the one or more second monitoring occasions and the one or more first monitoring occasions are both associated with a first UE-specific search space (USS) of a plurality of USSs associated with a same start offset;
monitoring for messages from the network entity within one or more monitoring occasions associated with a second USS of the plurality of USSs, wherein the second USS is associated with a periodicity that is an integer multiple of a second periodicity of the second monitoring pattern and a third periodicity of a third monitoring pattern; and
monitoring, after expiry of a second timer associated with the second monitoring pattern, for messages from the network entity within one or more third monitoring occasions defined by the third monitoring pattern, the one or more third monitoring occasions being included within the activation period associated with the one or more first monitoring occasions.

23. A method of wireless communication performed by a network entity, comprising:
transmitting, to a user equipment (UE), a discontinuous reception (DRX) configuration to configure a DRX cycle; and
transmitting, to the user equipment (UE) and within an activation period for a control channel associated with the UE, scheduling information in one or more first monitoring occasions defined by a first monitoring pattern or in one or more second monitoring occasions defined by a second monitoring pattern, based at least in part on whether a timer associated with the first monitoring pattern has expired, the one or more first monitoring occasions and the one or more second monitoring occasions being associated with different periodicities, wherein the one or more first monitoring occasions are associated with a first periodicity, wherein the first timer is set to an integer multiple of the first periodicity;

transmitting, to the UE, the scheduling information in one or more third monitoring occasions defined by a third monitoring pattern, based at least in part on whether a second timer associated with the second monitoring pattern has expired, wherein the one or more first monitoring occasions, the one or more second monitoring occasions, and the one or more third monitoring occasions are all associated with a first UE-specific search space (USS), the one or more second monitoring occasions and the one or more third monitoring occasions being included within the activation period; and transmitting, to the UE, additional scheduling information in one or more monitoring occasions defined by a second USS, wherein the second USS is associated with a periodicity that is an integer multiple of a second periodicity of the second monitoring pattern and a third periodicity of the third monitoring pattern.

24. The apparatus of claim 12, wherein the DRX cycle includes a DRX on duration and an opportunity to enter a DRX sleep state, and wherein the first timer is configured to expire prior to the UE entering the DRX sleep state.

25. The method of claim 23, wherein the DRX cycle repeats with a configured periodicity according to the DRX configuration.

26. The method of claim 23, wherein the first timer is reset when the scheduling information is associated with new data from the network entity or resources for the UE to transmit new data.

27. The apparatus of claim 1, wherein the one or more third monitoring occasions are associated with the first USS.

28. The apparatus of claim 1, wherein the UE begins monitoring the plurality of USSs when re-entering the activation period in accordance with the same start offset.

29. The method of claim 22, wherein the one or more third monitoring occasions are associated with the first USS.

30. The method of claim 23, wherein the second USS and the first USS are associated with a same start offset, wherein the UE begins monitoring the plurality of USSs when re-entering the activation period in accordance with the same start offset.

* * * * *